(12) United States Patent
Camagna et al.

(10) Patent No.: US 7,620,825 B2
(45) Date of Patent: Nov. 17, 2009

(54) SYSTEMS AND METHODS OPERABLE TO ALLOW LOOP POWERING OF NETWORKED DEVICES

(75) Inventors: John R. Camagna, El Dorado Hills, CA (US); Sajol Ghoshal, Austin, TX (US); Francois Crepin, Orangevale, CA (US)

(73) Assignee: Akros Silicon Inc., Folsom, CA (US)

( * ) Notice: Subject to any disclaimer, the term of this patent is extended or adjusted under 35 U.S.C. 154(b) by 455 days.

(21) Appl. No.: 11/207,601

(22) Filed: Aug. 19, 2005

(65) Prior Publication Data

US 2009/0265563 A1    Oct. 22, 2009

Related U.S. Application Data

(60) Provisional application No. 60/665,766, filed on Mar. 28, 2005.

(51) Int. Cl.
*G06F 1/26* (2006.01)
(52) U.S. Cl. ............................... 713/300; 713/340
(58) Field of Classification Search ......... 713/300–375; 323/265, 266
See application file for complete search history.

(56) References Cited

U.S. PATENT DOCUMENTS 5,179,586 A * 1/1993 Lee .................... 379/93.05
2002/0149034 A1* 10/2002 Sakiyama et al. ........... 257/200
2002/0191553 A1* 12/2002 Lehr et al. .................. 370/318
2004/0232768 A1* 11/2004 Hung et al. ..................... 307/3
2005/0246557 A1* 11/2005 Vanzante ..................... 713/300

* cited by examiner

*Primary Examiner*—Mark Connolly
*Assistant Examiner*—Paul B Yanchus, III

(57) ABSTRACT

Embodiments of the present invention provide a network device operable to receive a network signal that may include both power and data from a coupled network. This network device includes a network connector and an integrated circuit. The network connector physically couples the network device to the network. An optional protection circuit may provide surge protection or incoming network signals received by the network device through the network connector. An optional switching/rectifying circuit sees the output of the protection circuit and is operable to rectify a power signal when contained within the network signal. The integrated circuit further includes a power feed circuit conductively coupled to the protection circuit and the rectifying circuit. This power feed circuit is operable to separate and pass the received data signal to a network physical layer and separate and pass the received power signal to a power management module. The power management module electrically couples to the integrated circuit but is not necessarily part of the integrated circuit. The power management module is operable to at least partially power the network device for specific circuits within the network device from the received power signal.

25 Claims, 11 Drawing Sheets

SYSTEMS AND METHODS OPERABLE TO ALLOW LOOP POWERING OF NETWORKED DEVICES

CROSS REFERENCE TO RELATED APPLICATIONS

This application claims the benefit of priority to and incorporates herein by reference in its entirety for all purposes, U.S. Provisional Patent Application No. 60/665,766 entitled "SYSTEMS AND METHODS OPERABLE TO ALLOW LOOP POWERING OF NETWORKED DEVICES," by John R. Camagna, et al. filed on Mar. 28, 2005. This application is related to and incorporates herein by reference in its entirety for all purposes, U.S. patent application Ser. Nos. 11/207,595 entitled "METHOD FOR HIGH VOLTAGE POWER FEED ON DIFFERENTIAL CABLE PAIRS," by John R. Camagna, et al.; and 11/207,602 entitled "A METHOD FOR DYNAMIC INSERTION LOSS CONTROL FOR 10/100/1000MHZ ETHERNET SIGNALLING," by John R. Camagna, et al., which have been filed concurrently.

TECHNICAL FIELD OF THE INVENTION

The present invention relates generally to power distribution, and more particularly, a solid state transformer-less method for coupling high bandwidth data signals and power signals between a network and a network attached device.

BACKGROUND OF THE INVENTION

Many networks such as local and wide area networks (LAN/WAN) structures are used to carry and distribute data communication signals between devices. The various network elements include hubs, switches, routers, and bridges, peripheral devices, such as, but not limited to, printers, data servers, desktop personal computers (PCs), portable PCs and personal data assistants (PDAs) equipped with network interface cards. All these devices that connect to the network structure require power in order to operate. The power of these devices may be supplied by either an internal or an external power supply such as batteries or an AC power via a connection to an electrical outlet.

Some network solutions offer to distribute power over the network in addition to data communications. The distribution of power over a network consolidates power and data communications over a single network connection to reduce the costs of installation, ensures power to key network elements in the event of a traditional power failure, and reduces the number of required power cables, AC to DC adapters, and/or AC power supplies which create fire and physical hazards. Additionally, power distributed over a network such as an Ethernet network may provide an uninterruptible power supply (UPS) to key components or devices that normally would require a dedicated UPS.

Additionally, the growth of network appliances, such as but not limited to, voice over IP (VoIP) telephones require power. When compared to their traditional counterparts, these network appliances require an additional power feed. One drawback of VoIP telephony is that in the event of a power failure, the ability to contact to emergency services via an independently powered telephone is removed. The ability to distribute power to network appliances or key circuits would allow network appliances, such as the VoIP telephone, to operate in a similar fashion to the ordinary analog telephone network currently in use.

The distribution of power over Ethernet network connections is in part governed by the IEEE Standard 802.3 and other relevant standards. These standards are incorporated by reference. However, these power distribution schemes within a network environment typically require cumbersome, real estate intensive, magnetic transformers. Additionally, power over Ethernet (PoE) requirements under 802.3 are quite stringent and often limit the allowable power.

There are many limitations associated with using these magnetic transformers. Transformer core saturation can limit the current that can be sent to a power device. This may further limit the performance of the communication channel. The cost and board space associated with the transformer comprise approximately 10 percent of printed circuit board (PCB) space within a modern switch. Additionally, failures associated with transformers often account for a significant number of field returns. The magnetic fields associated with the transformers can result in lower electromagnetic interference (EMI) performance.

However, magnetic transformers also perform several important functions such as providing DC isolation and signal transfer in network systems. Thus, there is a need for an improved approach to distributing power in a network environment that addresses limitations imposed by magnetic transformers while maintaining the benefits thereof.

SUMMARY OF THE INVENTION

Embodiments of the present invention provide a system and method operable to provide a voltage power feed on differential cable pairs to network attached powered devices (PD). This voltage power feed to PDs substantially addresses the above-identified needs, as well as others. More specifically, one embodiment of the present invention provides a network device operable to receive a network signal that may include both power and data from a coupled network. This network powered device (PD) includes a network connector operably coupled to an integrated circuit (IC). The network connector physically couples the network PD to the network. The PD may further include a protection circuit and switching/rectifying circuit between the IC and network connector. Such a protection circuit may provide surge protection (i.e. voltage spike and lightning protection) for incoming network signals. The switching/rectifying circuit may receive the output of the protection circuit and rectifies or switches the power signal to ensure power with a proper polarity is applied to the IC. The protection and switching/rectifying circuits may not be required in a back plane application where the polarity of the power signal is known. The IC includes a power feed circuit operable to separate the power signal from the data signal. The IC conductively couples to the network connector. Conductively coupling eliminates the use of magnetic transformers to magnetically couple to and receive the power signal and communication (data) signal from the network connector. This power feed circuit separates and passes the received data signal to a network physical layer (PHY). The power feed circuit also separates and passes the received power signal to a power management module. The power management module electrically couples to the IC but is not necessarily part of the IC. The power management module at least partially powers the network attached PD (for specific circuits within the network attached device) from the received power signal.

In another embodiment, the network attached PD is an Ethernet network device (or Ethernet/network appliance) operable to receive both a power and data signal from a coupled Ethernet network. An Ethernet network connector (i.e. RJ45 connector) physically couples the Ethernet network device to the Ethernet network wherein the Ethernet network connector receives a number of twisted pairs. Specific embodiments may utilize surge protection and switching/rectifying circuits to condition the received power signal from the Ethernet network. This power signal feeds to an IC that further includes a power feed circuit. The power feed circuit conductively couples (i.e., couples without the use of a magnetic transformer) to receive the network signal form the network connector. The power feed circuit may receive, separate and pass the data signal to an Ethernet PHY module, as well as receive, separate and pass the power signal to the power management module. This power management module at least partially powers the Ethernet network device or specific circuits therein from the received power signal. The integrated circuit, in addition to including the power feed circuit, may optionally include additional circuits, such as the surge protection circuit, a switching or rectifying circuit, such as a diode bridge network, the power management circuit, the Ethernet PHY, an Ethernet media access controller (MAC), as well as other network attached device specific processing modules.

Yet another embodiment provides a method to at least partially power a network attached PD, such as, but not limited to, an Ethernet network PD, from a power signal fed through a network connection. This involves physically coupling the network device to the network. A network signal is then received from the network that includes a power signal and/or a data signal. Certain embodiments may pass the network signal through protective circuitry operable to provide surge protection to downstream components. The power signal within the network signal is rectified and provided to a power feed circuit (that may be implemented within an IC or as discrete board level components) coupled to the protective circuit. The power feed circuit separates the data signal from the network signal and then passes the data signal to a network PHY module. Similarly, the power feed circuit may also separate the rectified power signal from the network signal and then pass the power signal to a power management module. This power management module then powers the network device, or specific circuits therein, from power fed through the received power signal.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION

Figure 1A:
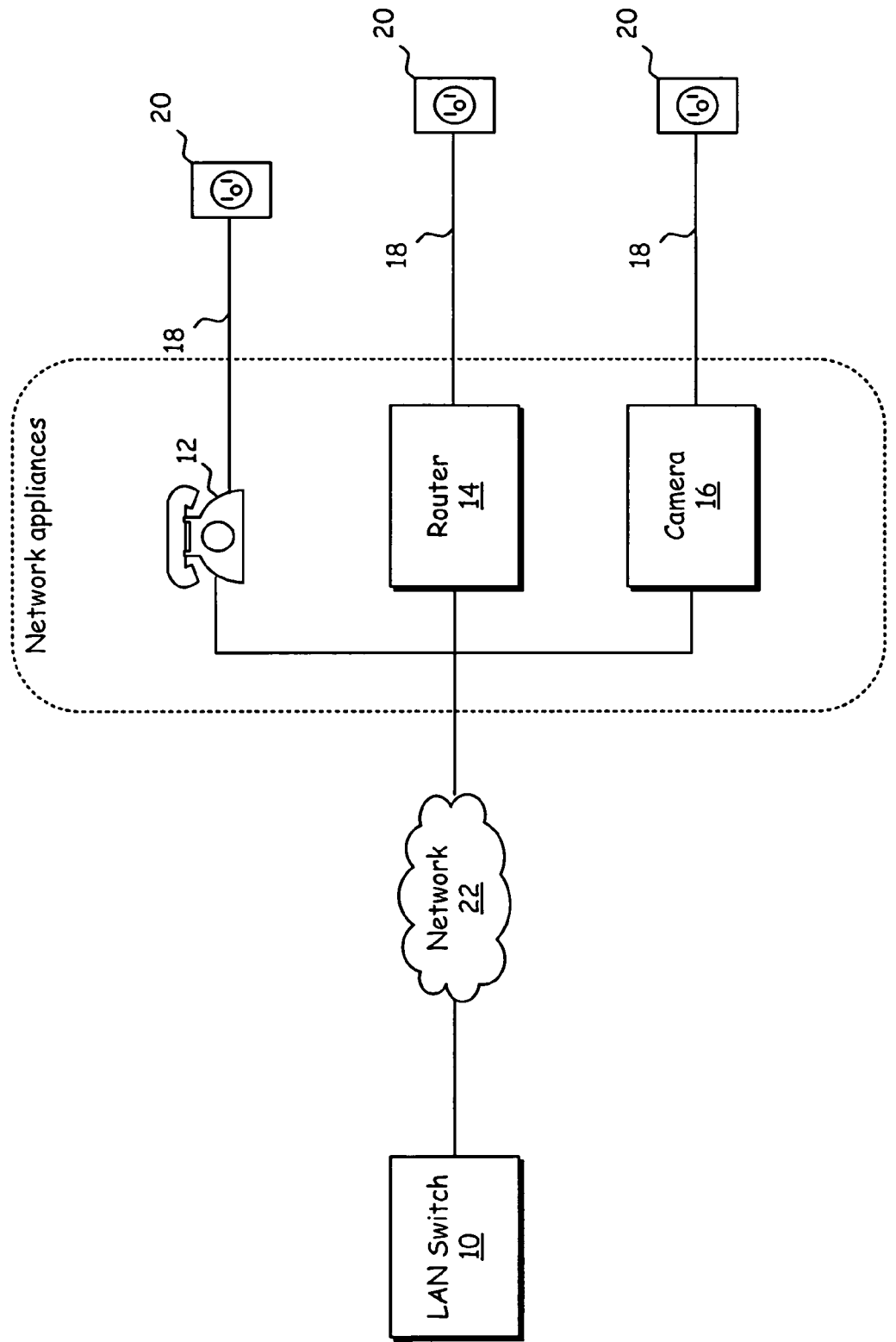
FIG. 1A depicts current Ethernet network appliances attached to the network and powered separately and their separate power connections.

Preferred embodiments of the present invention are illustrated in the FIGs., like numerals being used to refer to like and corresponding parts of the various drawings.

The 802.3 Ethernet Standards, which is incorporated herein by reference, allow loop powering of remote Ethernet devices (802.3af). The Power over Ethernet (PoE) standard and other like standards intends to standardize the delivery of power over Ethernet network cables in order to have remote client devices powered through the network connection. The side of link that supplies the power is referred to as Powered Supply Equipment (PSE). The side of link that receives the power is referred to as the Powered device (PD).

Replacing the magnetic transformer of prior systems while maintaining the functionality of the transformer has been subsumed into the embodiments of the present invention. In order to subsume the functionality of the transformer, the circuits provided by embodiments of the present invention, which may take the form of ICs or discrete components, are operable to handle these functions. These functions may include, in the case of an Ethernet network application:

1) coupling of a maximum of 57V to the IC with the possibility of 1V peak-peak swing of a 10/100/1000 M Ethernet signaling, (2.8Vp_p for MAU device);
2) splitting the signal; 57V DC to the 802.3af Power Control unit and AC data signal to the PHY (TX and RX), while meeting the high voltage stress.
3) coupling lower voltage (5 v and 3.3 v) PHY transceiver to high voltage cable (57V)
4) supplying power of 3.3V or 12V through DC-DC peak converter;
5) withstanding system-level lighting strikes: indoor lighting strike (ITU K.41); outdoor lighting strike (IEC 60590)
6) withstanding power cross @60 Hz. (IEC 60590)
7) fully supporting IEEE 802.3af Specification Other network protocols may allow different voltage (i.e., a 110 volt circuit coupling to the IC) data rates (i.e., 1 GBPS or higher), power rating.

In a solid-state implementation, common mode isolation between the earth ground of the device and the cable is not necessarily required. Fixed common mode offsets of up to 1500V are possible in traditional telephony systems. Embodiments of the present invention deliver power via cable and the earth ground is used solely for grounding of the device chassis. As there is no electrical connection between the earth and PoE ground, large voltage offsets are allowable.

Second, another transformer function provides surge and voltage spike protection from lightning strike and power cross faults. Wires inside the building comply with the ITU recommendation K.41 for lightning strikes. Lines external to the building must comply with IEC60590. Lightning strike testing as specified in these Standards consists in a common mode voltage surge applied between all conductors and the earth or chassis ground. As embodiments of the present invention uses the earth ground only for chassis protection, minimal stress will occur across the device, thus simplifying the circuits required by embodiments of the present invention.

In the case of 802.3.af, power is delivered via the center tap of the transmit transformer and receive signal transformers for transformer based designs. The embodiments of the present invention may take up to 400 ma DC from the common mode of the signal pair without disturbing the AC (1 MHz-100 MHz) differential signals on the transmit/receive pairs.

Embodiments of the present invention are operable to support PoE side applications as well. As several functions are integrated together, the entire IC ground will track the Ethernet line ground. This means that the IC potential will vary significantly (1500V) from the chassis ground. As no power is necessary from the local supply, the voltage drop will occur across an air gap.

Figure 1B:
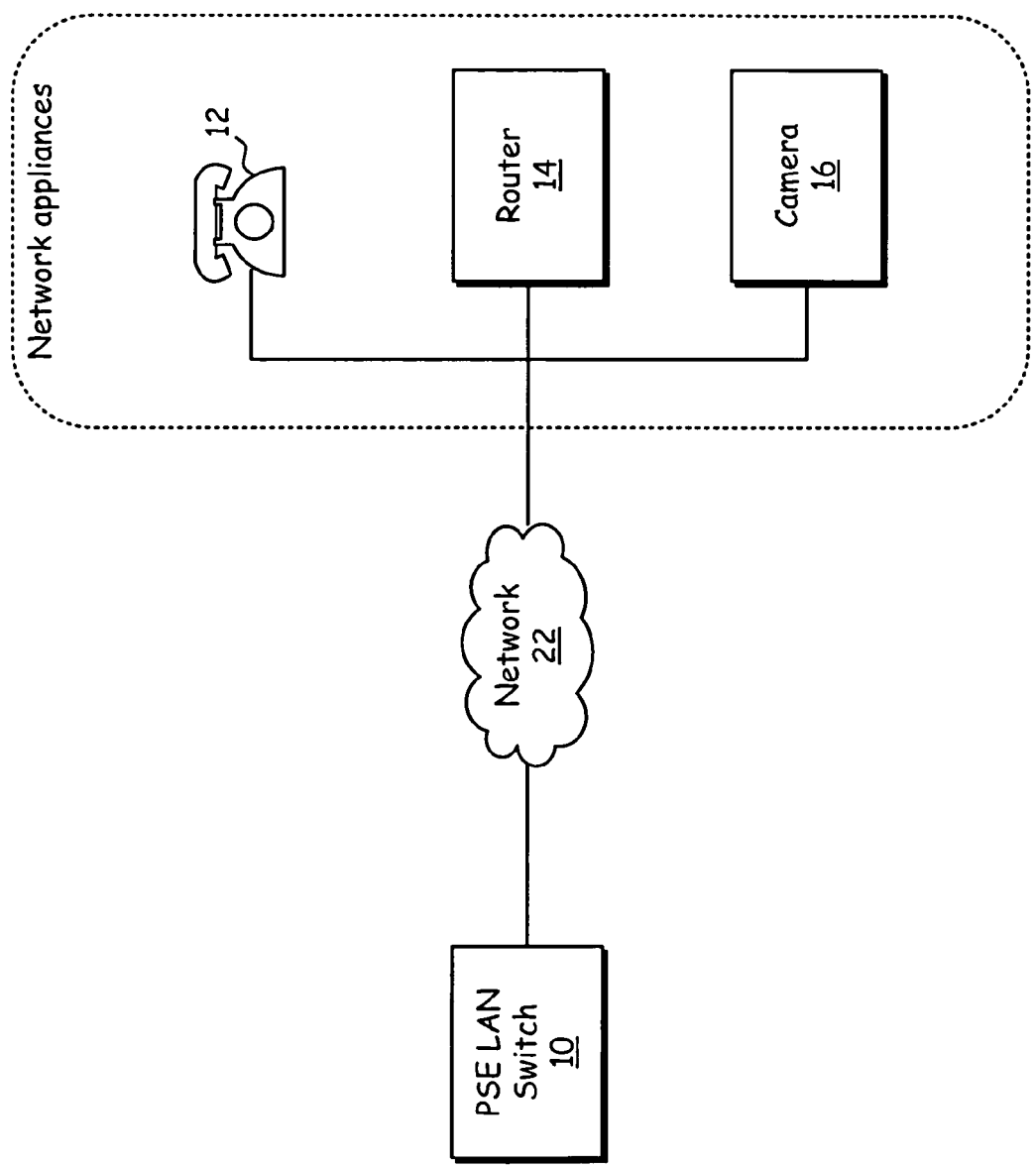
FIG. 1B depicts various Ethernet network powered devices (PDs) in accordance with embodiments of the present invention.

FIG. 1A illustrates exemplary devices where power is supplied separately to network attached client devices 12-16 that may benefit from receiving power and data via the network connection. These devices are serviced by LAN switch 10 for data. Additionally, each client device 12-16 has separate power connections 18 to electrical outlets 20. FIG. 1B illustrates exemplary devices where switch 10 is a power supply equipment (PSE) capable power-over Ethernet (PoE) enabled LAN switch that provides both data and power signals to client devices 12-16. The network attached devices may include VoIP telephone 12, access points, routers, gateways 14 and/or security cameras 16, as well as other known network appliances. This eliminates the need for client devices 12-16 to have separate power connections 18 to electrical outlets 20 as shown in FIG. 1A which are no longer required in FIG. 1B. Eliminating this second connection ensures that the network attached device will have greater reliability when attached to the network with reduced cost and facilitated deployment.

Figure 2A:
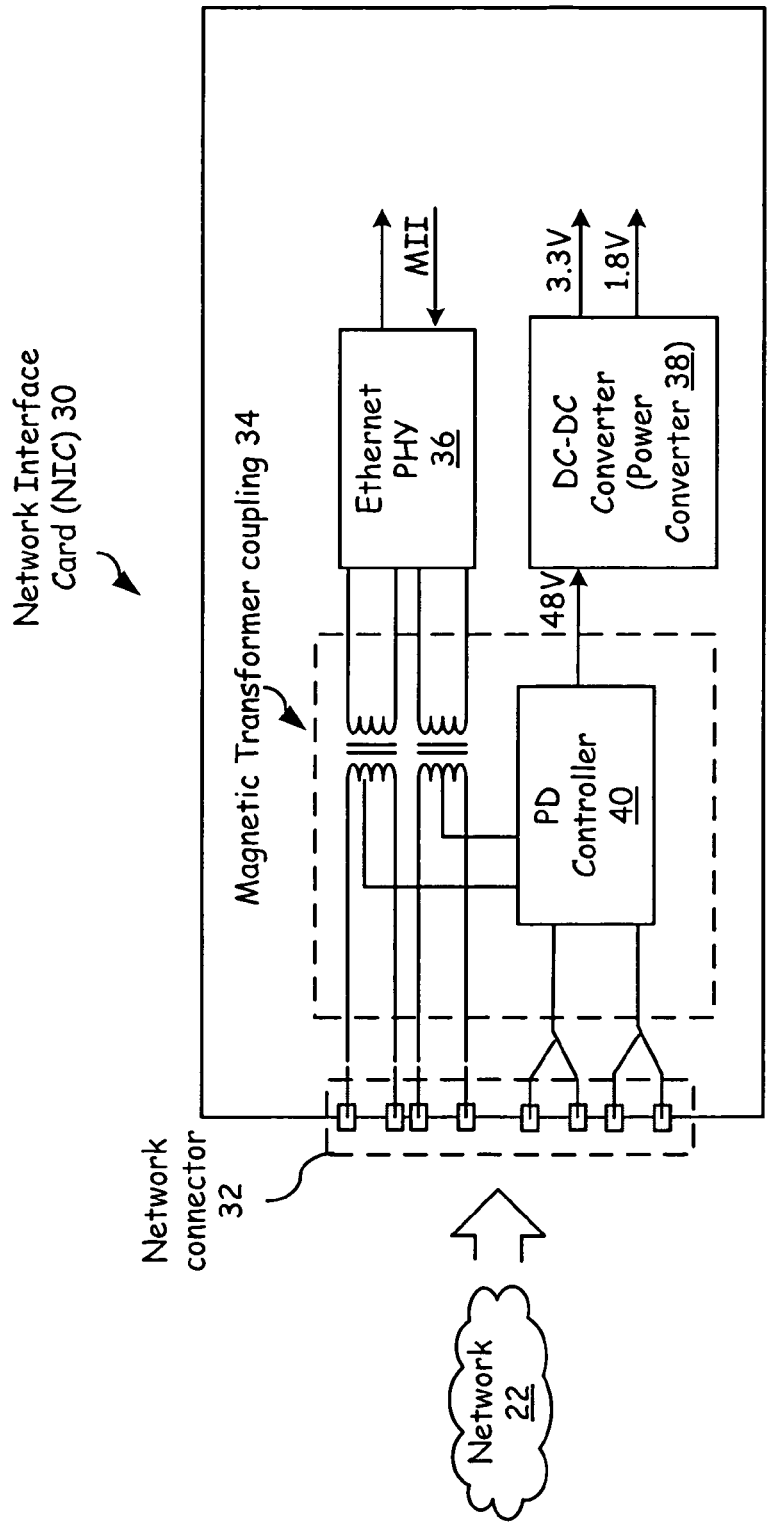
FIG. 2A shows a traditional real-estate intensive transformer based Network Interface Card (NIC)

FIG. 2A provides a typical prior art network interface card 30 for a PD that includes network connector 32, magnetic transformer 34, Ethernet PHY 36, power converter 38, and PD controller 40. Typically, these elements are all separate and discrete devices. Embodiments of the present invention are operable to eliminate the magnetic network transformer 34 and replace this discrete device with a power feed circuit. This power feed circuit may be implemented within an integrated circuit (IC) or as discrete components. Additionally, embodiments of the present invention may incorporate other functional specific processors, or any combination thereof into a single IC.

Figure 2B:
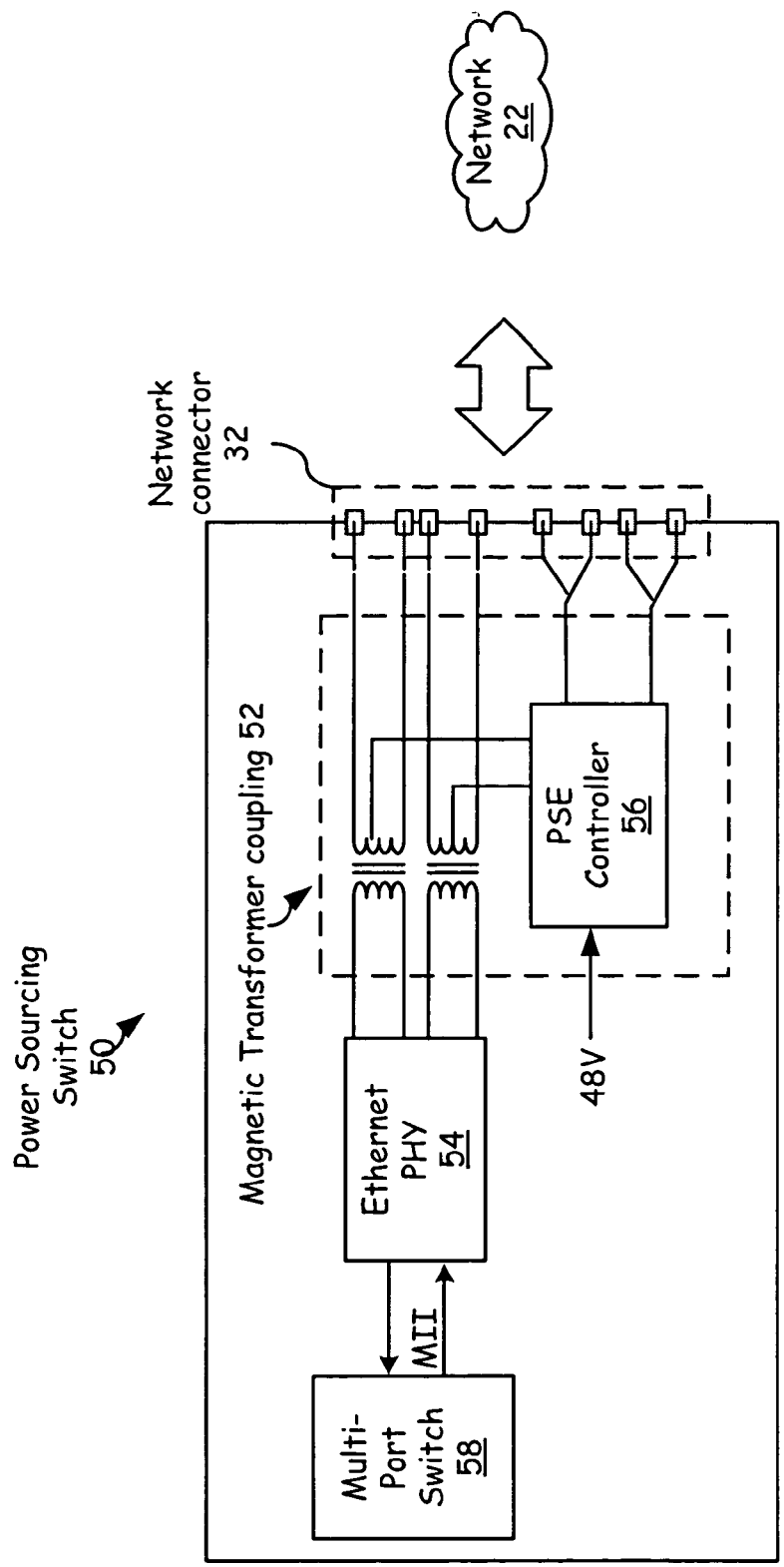
FIG. 2B provides a traditional functional block diagram of magnetic-based transformer power supply equipment (PSE)

FIG. 2B provides a typical PSE prior art device. Here, power sourcing switch 50 includes a network connector 32, magnetically coupled transformer 52, Ethernet physical layer 54, PSE controller 56, and multi-port switch 58. Typically these elements are all separate and discreet devices. Embodiments of the present invention are operable to eliminate the magnetically coupled transformer 52 and replace this transformer with discreet devices that may be implemented within ICs or as discreet devices.

Although the description herein may focus and describe a system and method for coupling high bandwidth data signals and power distribution between the IC and cable that uses transformer-less ICs with particular detail to the 802.3af Ethernet standard, these concepts may be applied in non-Ethernet applications and non 802.3af applications. Further, these concepts may be applied in subsequent standards that supersede the 802.3af standard.

Embodiments of the present invention may provide solid state (non-magnetic) transformer circuits operable to couple high bandwidth data signals and power signals with new mixed-signal IC technology in order to eliminate cumbersome, real-estate intensive magnetic-based transformers 34 and 52 as pictured in FIGS. 2A and 2B.

Modern communication systems use transformers 34 and 52 to provide common mode signal blocking, 1500 volt isolation, and AC coupling of the differential signature as well as residual lightning or electromagnetic shock protection. These functions are replaced by a solid state or other like circuits in accordance with embodiments of the present invention wherein the circuit may couple directly to the line and provide high differential impedance and low common mode impedance. High differential impedance allows separation of the PHY signal form the power signal. The low common mode impedance removes the need for a choke. This allows power to be tapped from the line. The local ground plane may float in order to eliminate the need for 1500 volt isolation. Additionally through a combination of circuit techniques and lightning protection circuitry, it is possible to provide voltage spike or lightning protection to the network attached device. This eliminates another function performed by transformers in traditional systems or arrangements. It should be understood that the technology may be applied anywhere where transformers are used and should not be limited to Ethernet applications.

Specific embodiments of the present invention may be applied to various powered network attached devices or Ethernet network appliances. Such appliances include, but are not limited to VoIP telephones, routers, printers, and other like devices known to those having skill in the art. Such exemplary devices are illustrated in FIG. 1B.

Figure 3A:
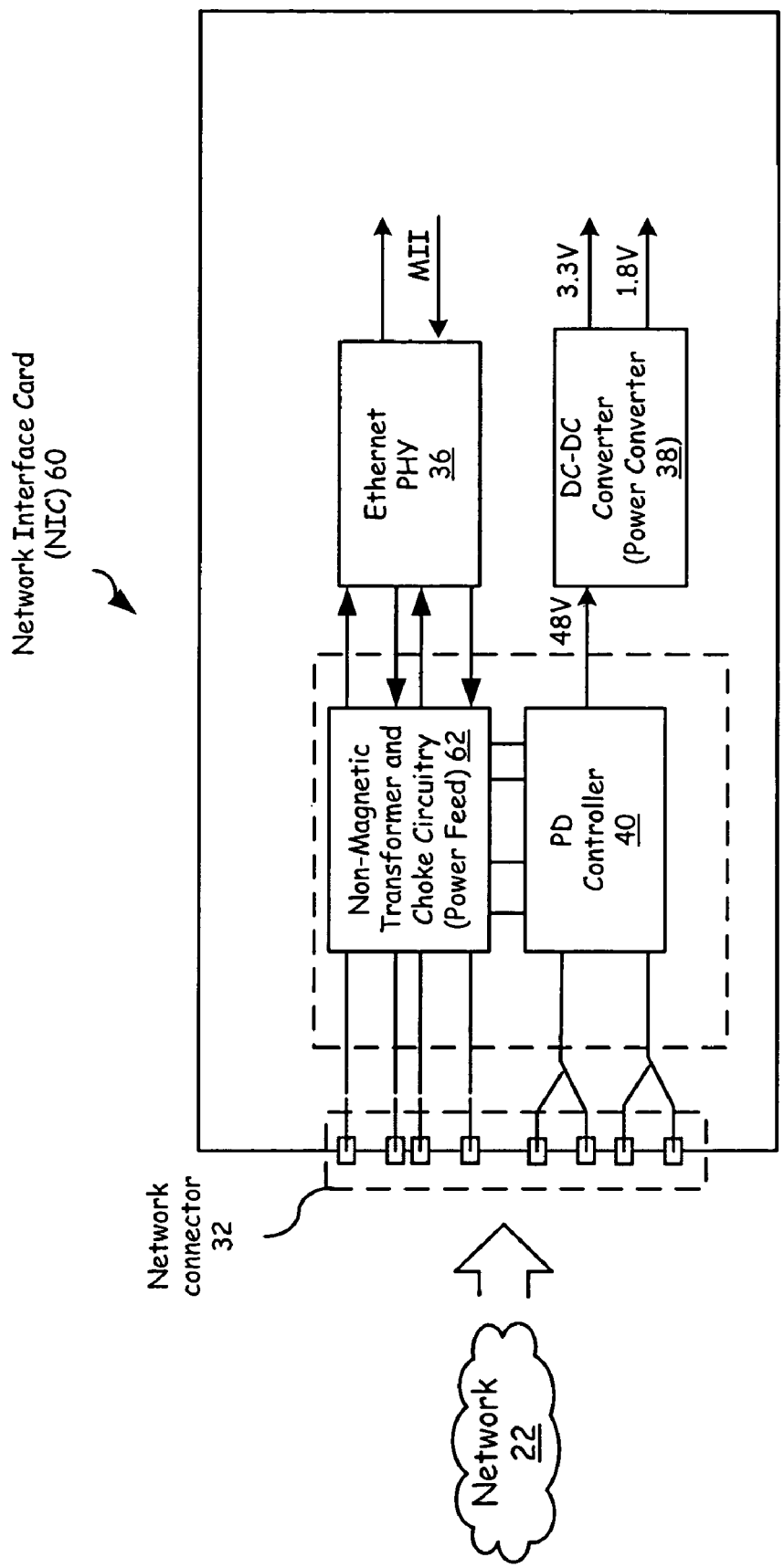
FIG. 3A provides a functional block diagram of a network powered device interface utilizing non-magnetic transformer and choke circuitry in accordance with embodiments of the present invention.

FIG. 3A is a functional block diagram of a network interface 60 that includes network connector 32, non-magnetic transformer and choke power feed circuitry 62, network physical layer 36, and power converter 38. Thus, FIG. 3A replaces magnetic transformer 34 with circuitry 62. In the context of an Ethernet network interface, network connector 32 may be a RJ45 connector operable to receive a number of twisted pairs. Protection and conditioning circuitry may be located between network connector 32 and non-magnetic transformer and choke power feed circuitry 62 to provide surge protection in the form of voltage spike protection, lighting protection, external shock protection or other like active functions known to those having skill in the art. Conditioning circuitry may take the form of a diode bridge or other like rectifying circuit. Such a diode bridge may couple to individual conductive lines 1-8 contained within the RJ45 connector. These circuits may be discrete components or an integrated circuit within non-magnetic transformer and choke power feed circuitry 62.

In an Ethernet application, the 802.3af standard (PoE standard) provides for the delivery of power over Ethernet cables to remotely power devices. The portion of the connection that receives the power may be referred to as the powered device (PD). The side of the link that provides the power is referred to as the power sourcing equipment (PSE). Two power feed options allowed in the 802.3af standard are depicted in FIG. 4A. In the first alternative, which will be referred to as alternative A, LAN switch 70, which contains PSE 76 feeds power to the Ethernet network attached device (PD) 72 along the twisted pair cable 74 used for the 10/100 Ethernet signal via the center taps 80 of Ethernet transformers 82. On the line side of the transfer, transformers 84 deliver power to PD 78 via conductors 1 and 2 and the center taps 86 and return via conductors 3 and 6 and the center taps 86. In the second alternative, conductors 4, 5, 7 and 8 are used to transmit power without transformers. Conductors 4, 5, 7 and 8 remain unused for 10/100 Ethernet data signal transmissions. FIG. 4B depicts that the network interface of FIG. 3A and power sourcing switch of FIG. 3B may be used to implements these alternatives and their combinations as well.

Returning to FIG. 3A, conductors 1 through 8 of the network connector 32, when this connector takes the form of an RJ45 connector, couple to non-magnetic transformer and choke power feed circuitry 62 regardless of whether the first or second alternative provided by 802.3af standard is utilized. These alternatives will be discussed in more detail with reference to FIGS. 5A and 5B. Non-magnetic transformer and choke power feed circuitry 62 may utilize the power feed circuit and separates the data signal portion from the power signal portion. This data signal portion may then be passed to network physical layer 36 while the power signal is passed to power converter 38.

In the instance where network interface 60 is used to couple the network attached device or PD to an Ethernet network, network physical layer 36 may be operable to implement the 10 Mbps, 100 Mbps, and/or 1 Gbps physical layer functions as well as other Ethernet data protocols that may arise. The Ethernet PHY 36 may additionally couple to an Ethernet media access controller (MAC). The Ethernet PHY 36 and Ethernet MAC when coupled are operable to implement the hardware layers of an Ethernet protocol stack. This architecture may also be applied to other networks. Additionally, in the event that a power signal is not received but a traditional, non-power Ethernet signal is received the nonmagnetic power feed circuitry 62 will still pass the data signal to the network PHY.

The power signal separated from the network signal within non-magnetic transformer and choke power feed circuit 62 by the power feed circuit is provided to power converter 38. Typically the power signal received will not exceed 57 volts SELV (Safety Extra Low Voltage). Typical voltage in an Ethernet application will be 48-volt power. Power converter 38 may then further transform the power as a DC to DC converter in order to provide 1.8 to 3.3 volts, or other voltages as may be required by many Ethernet network attached devices.

Figure 3B:
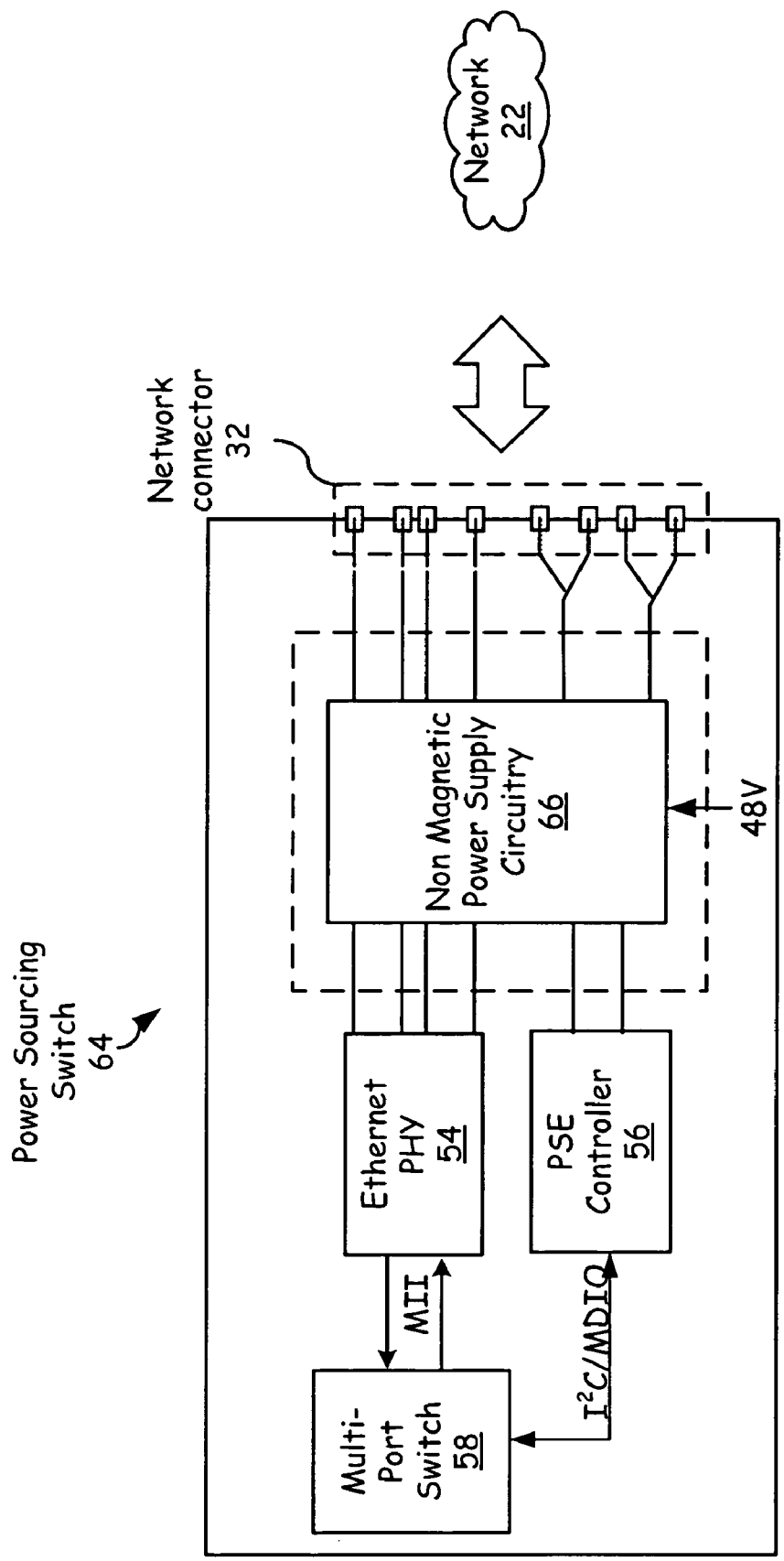
FIG. 3B provides a functional block diagram of a PSE utilizing non-magnetic transformer and choke circuitry in accordance with embodiments of the present invention.
Figure 4A:
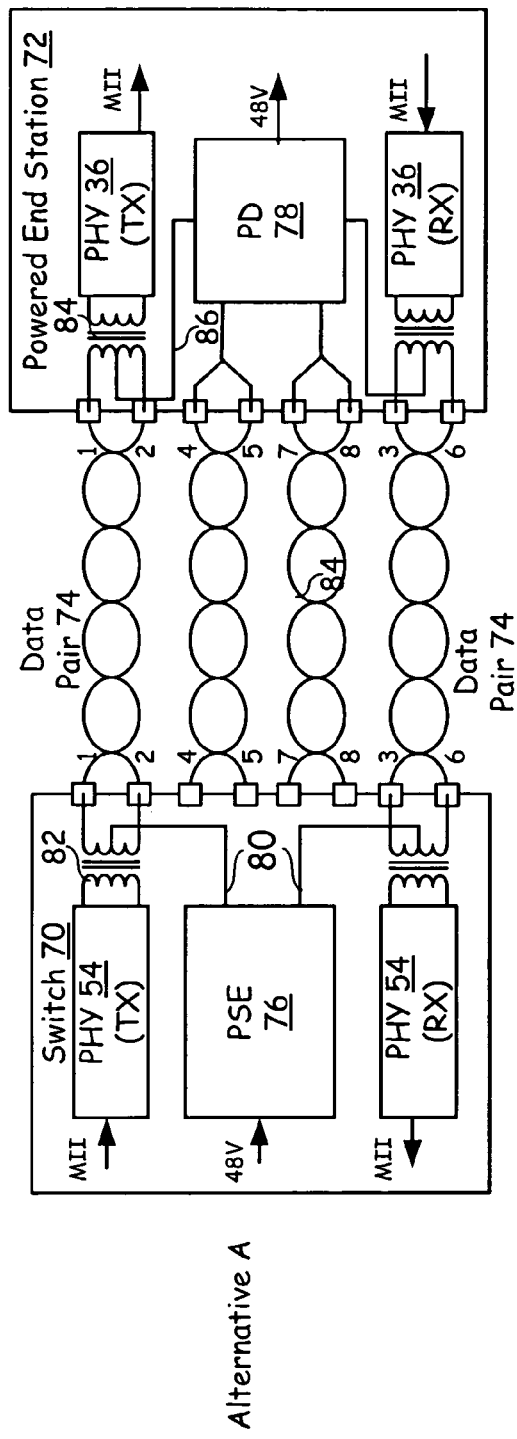
FIG. 4A illustrates two allowed power feeding schemes per the 802.3af standard.
Figure 4A:
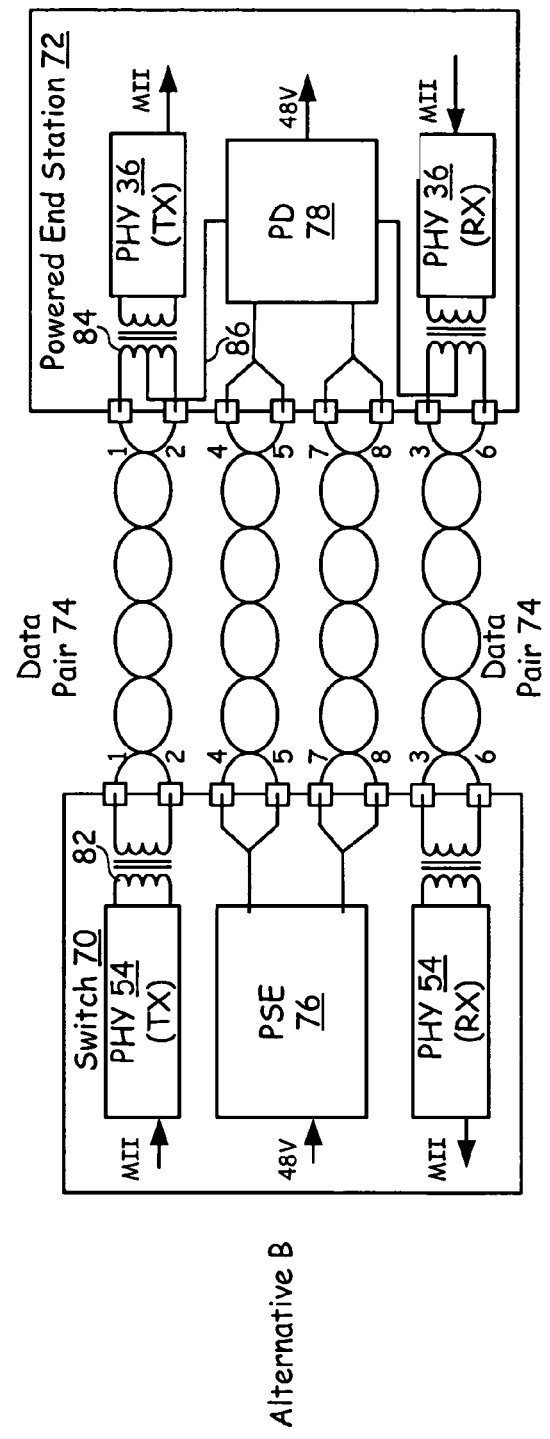
Figure 4B:
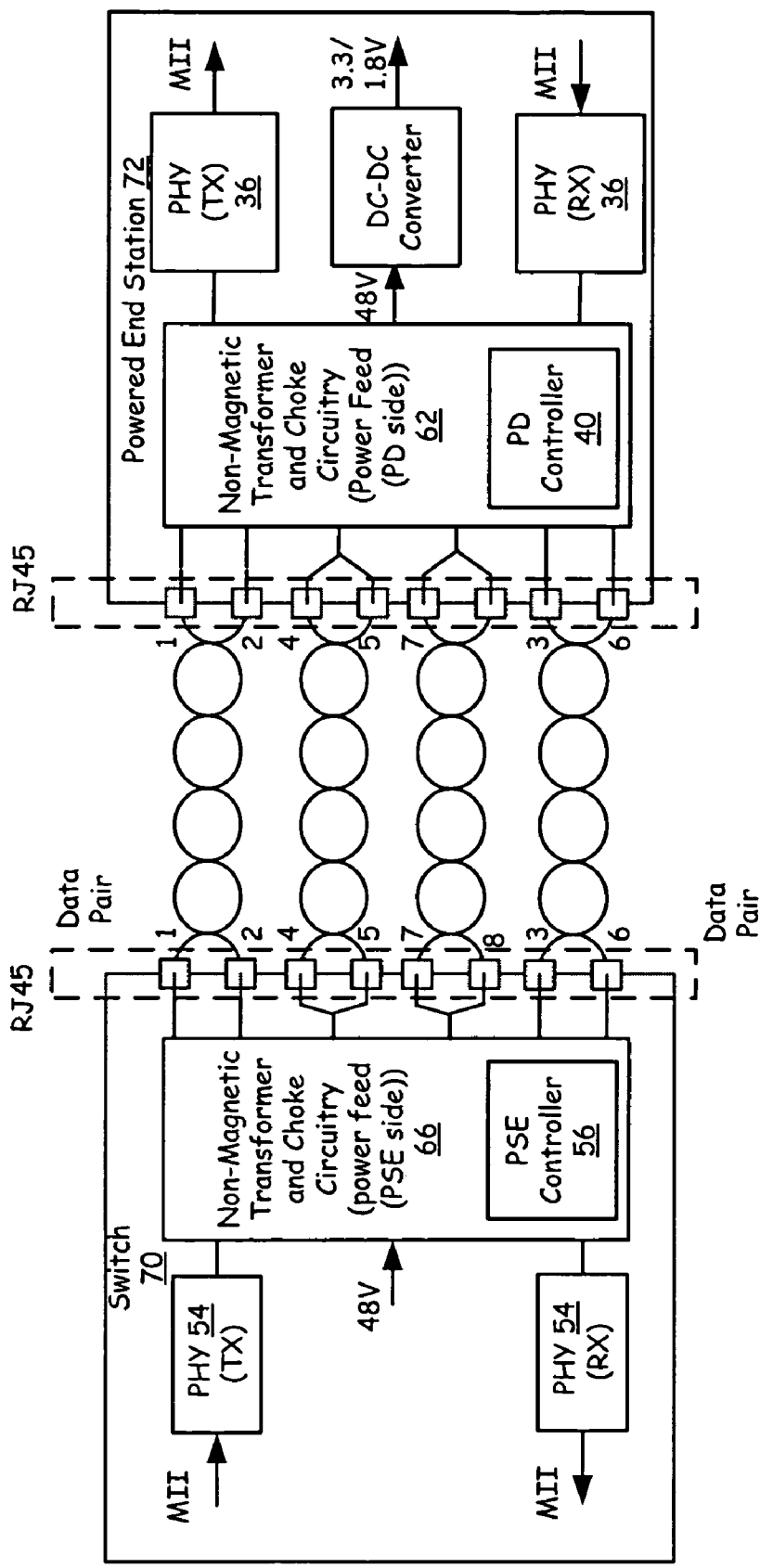
FIG. 4B illustrates the use of embodiments of the present invention to deliver both the power feeding schemes illustrated with FIG. 4A allowed per the 802.3af standard.

FIG. 3B is a functional block diagram of a power-sourcing switch 64 that includes network connector 32, Ethernet or network physical layer 54, PSE controller 56, multi-port switch 58, and non-magnetic transformer and choke power supply circuitry 66. FIG. 3B is similar to that provided in FIG. 2B, wherein the transformer has been replaced with non-magnetic transformer and choke power supply circuitry 66. This power-sourcing switch may be used to supply power to network attached devices in place of the power source equipment disclosed in FIG. 2B.

Network interface 60 and power sourcing switch 64 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All of these may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other like networks known to that having skill in the art. Other embodiments may supply power to network attached devices over alternative networks such as but not limited to a HomePNA local area network and other like networks known to those having skill in the art. The HomePNA uses existing phone wires to share a single network connection within a home or building. Alternatively, embodiments of the present invention may be applied where network data signals are provided over power lines.

Non-magnetic transformer and choke power feed circuitry 62 and 66 eliminate the use of magnetic transformers with integrated system solutions that provide the opportunity to increase system density by replacing magnetic transformers 34 and 52 with solid state power feed circuitry in the form of an IC or discreet component.

Figure 5:
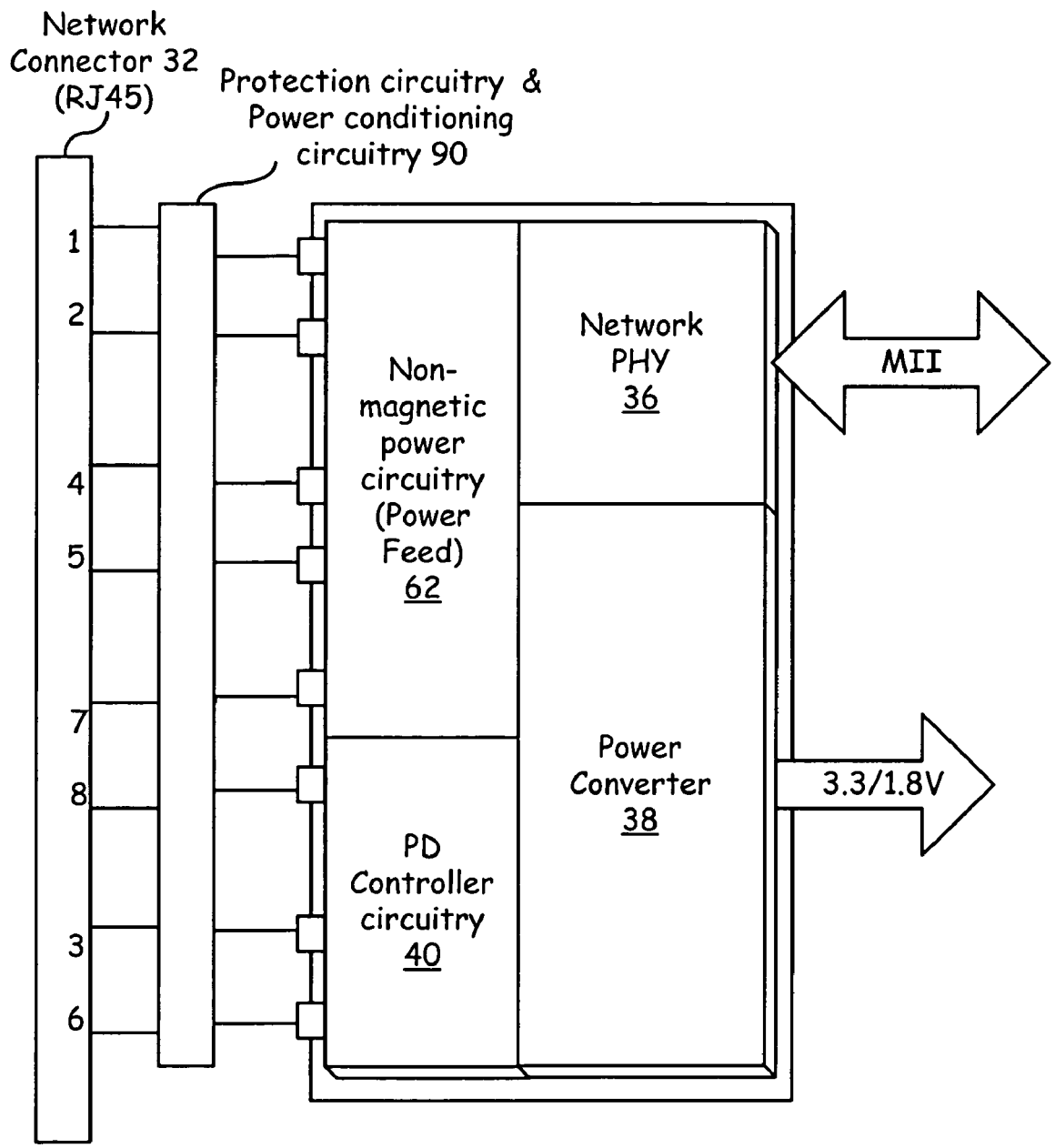
FIG. 5 shows an embodiment of a network powered device (PD) in accordance with an embodiment of the present invention that integrates devices at the IC level for improved performance.

FIG. 5 provides an illustration of an embodiment wherein the non-magnetic transformer and choke power feed circuitry 62, network physical layer 36, power distribution management circuitry 54, and power converter 38 are integrated into a single integrated circuit as opposed to being discrete components at the printed circuit board level. Optional protection and power conditioning circuitry 90 may be used to interface the IC to the network connector.

The Ethernet PHY may support the 10/100/1000 Mbps data rate and other future data networks such as a 10000 Mbps Ethernet network. The non-magnetic transformer and choke power feed circuitry 62 will supply the line power minus the insertion loss directly to the power converter 38. This will convert the power first to a 12 v supply, then subsequently to the lower supply levels. This circuit may be implemented in the 0.18 or 0.13 micron process or other like process known to those having skill in the art.

The non-magnetic transformer and choke power feed circuitry 62 implements three main functions: 802.3.af signaling and load compliance, local unregulated supply generation with surge current protection and signal transfer between the line and integrated Ethernet PHY. As the devices are directly connected to the line, the circuit may be required to withstand a secondary lightning surge.

In order for the PoE to be 802.3af standard compliant, the PoE may be required to be able to accept power with either power feeding schemes illustrated in FIGS. 4A and 4B and handle power polarity reversal. A rectifier, such as a diode bridge, or a switching network, may be implemented to ensure power signals having an appropriate polarity are delivered to the nodes of the power feed circuit. Any one of the conductors 1,4,7 or 3 of the network RJ45 connection can forward bias to deliver current and any one of the return diodes connected can forward bias provide a return current path via one of the remaining conductors. Conductors 2, 5, 8 and 4 are connected in a similar fashion.

The non-magnetic transformer and choke power feed circuitry when applied to PSE may take the form of a single or multiple port switch in order to supply power to single or multiple devices attached to the network. FIG. 3B provides a functional block diagram of power sourcing switch 64 operable to receive power and data signals and then combine these with power signals, which are then distributed via an attached network. In the case where power sourcing switch 64 is a gateway or router, a high-speed uplink couples to a network such as an Ethernet network or other like network. This data signal is relayed via network PHY 54 and then provided to non-magnetic transformer and choke power feed circuitry 66. The PSE switch may be attached to an AC power supply or other internal or external power supply in order to provide a power signal to be distributed to network-attached devices that couple to power sourcing switch 64. Power controller 56 within or coupled to non-magnetic transformer and choke power feed circuitry 66 may determine, in accordance with IEEE standard 802.3af, whether or not a network-attached device, in the case of an Ethernet network-attached device, is a device operable to receive power from power supply equipment. When it is determined in the case of an 802.3af compliant PD is attached to the network, power controller 56 may supply power from power supply to non-magnetic transformer and choke power feed circuitry 66, which is then provided to the downstream network-attached device through network connectors, which in the case of the Ethernet network may be an RJ45 receptacle and cable.

The 802.3af Standard is intended to be fully compliant with all existing non-line powered Ethernet network systems. As a result, the PSE is required to detect via a well defined procedure whether or not the far end is PoE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts. At this point the power MOSFETs are enabled and the large bypass capacitor begins to charge.

The maintain power signature is applied in the PoE signature block—a minimum of 10 mA and a maximum of 23.5 kohms may be required to be applied for the PSE to continue to feed power. The maximum current allowed is limited by the power class of the device (class 0-3 are defined). For class 0, 12.95 W is the maximum power dissipation allowed and 400 ma is the maximum peak current. Once activated, the PoE will shut down if the applied voltage falls below 30V and disconnect the power MOSFETs from the line.

The power feed devices in normal power mode provide a differential open circuit at the Ethernet signal frequencies and a differential short at lower frequencies. The common mode circuit will present the capacitive and power management load at frequencies determined by the gate control circuit.

Figure 6:
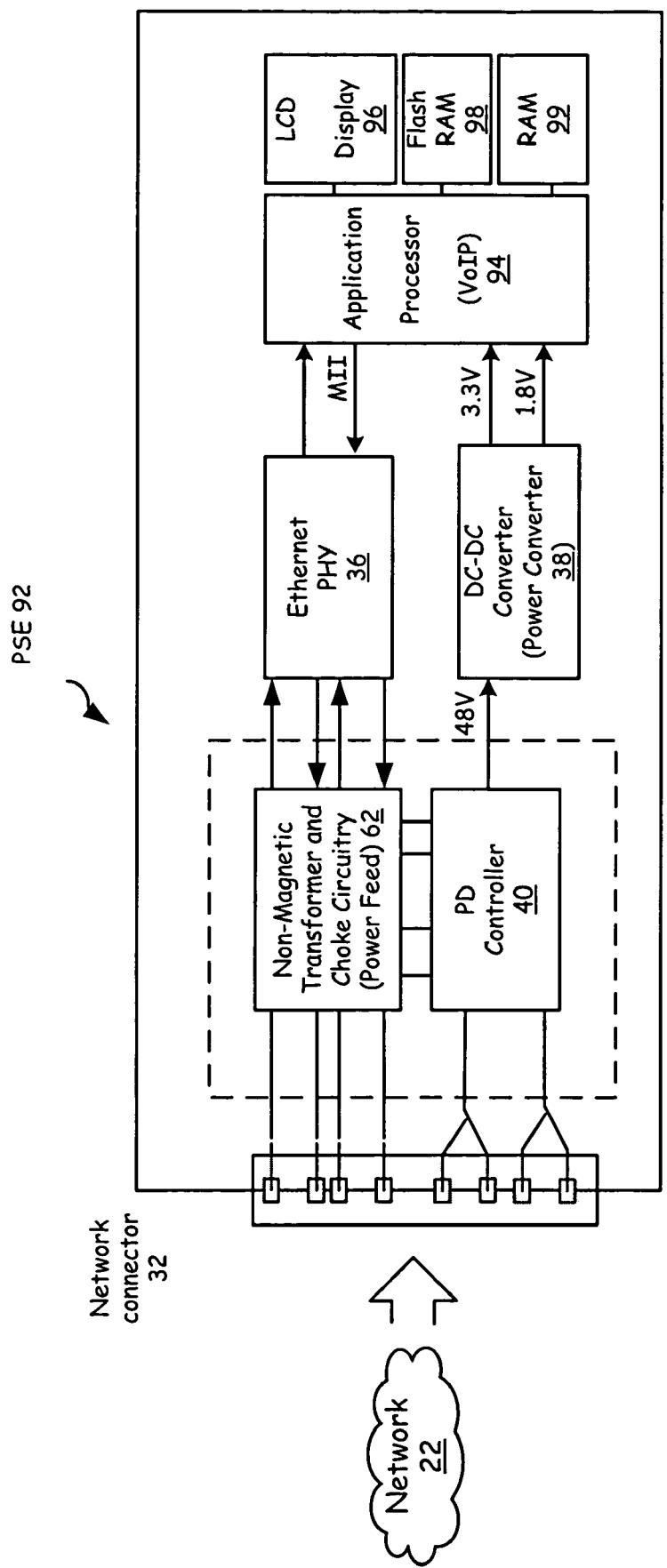
FIG. 6 illustrates the technology associated with embodiments of the present invention as applied in the case of an enterprise VoIP phone.

FIG. 6 provides a functional block diagram of a specific network attached appliance 92. In this case, the network attached appliance is a VoIP telephone. Network connector 32 takes form of an Ethernet network connector, such as RJ45 connector, and passes Ethernet signals to power feed circuitry 62 and PD controller 40. Non-magnetic transformer and choke power feed circuitry 62 separates the data signal and power signal. The data signal is provided to network physical layer 36. Network physical layer 36 couples to a network MAC to execute the network hardware layer. An application specific processor, such as VoIP processor 94 or related processors, couples to the network MAC. Additionally, the VoIP telephone processors and related circuitry (display 96 and memory 98 and 99) may be powered by power converter 38 using power fed and separated from the network signal by non-magnetic transformer and choke power feed circuitry 62. In other embodiments, other network appliances, such as cameras, routers, printers and other like devices known to those having skill in the art are envisioned.

Figure 7:
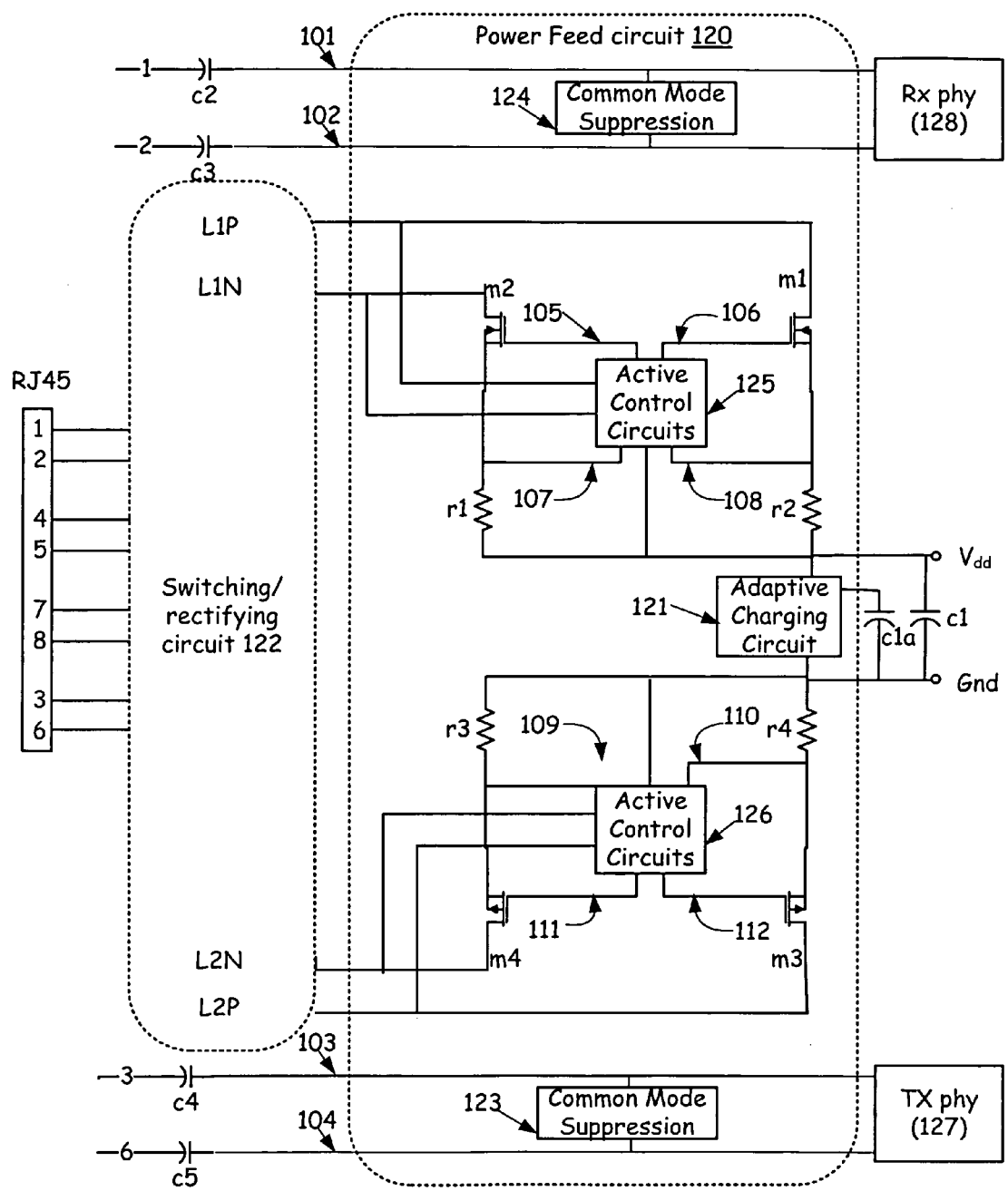
FIG. 7 illustrates one embodiment of a power feed circuit in accordance with an embodiment of the present invention.

Additional circuits may be used to implement specific functions in accordance with various embodiments of the present invention. One embodiment of a power feed circuit diagram is provided in FIG. 7. FIG. 7 contains a power feed circuit 120 located within non-magnetic transformer and choke power feed circuitry 62. The Ethernet network (network) power signal is received and complies with both alternative A and/or alternative B of 802.3af. Switching/rectifying circuit 122 receives the power signal from the RJ45 connector. The switching/rectifying circuit may receive the output of a surge protection circuit (not shown) or network connector 32, such as the RJ45 connector and rectify or switch the power signal to ensure a power signal with a proper polarity is applied to power feed circuit 120 of a PD. Protection and switching/rectifying circuits may not be required in a back plane application where the polarity of the power signal is known. Switching/rectifying circuit 122 may take the form of a diode bridge or network of switches (i.e. transistors) that may be located within an IC or discrete components. The power signal is provided at nodes L1N and L1P on the receive side and on the transmit side L2N and L2P of the power feed circuit as shown in FIG. 7. The Ethernet power signals pass through differential transistor pairs. The differential transistor pairs are shown as pairs M1 and M2 as well as M3 and M4. Individual Ethernet power signals pass through differential transistor pairs M1 or M2 on the receive side and M3 and M4 on the transmit side. The transistors shown may be MOSFET transistors, bipolar transistors, or other like transistors known to those having skill in the art. The power signal then will pass through a sense impedance such as resistor R1 and R2 on the receive side or R3 and R4 on the transmit side. Although the sense impedance is shown as a purely resistive impedance, this impedance may be a resistor and inductor in parallel or series or other like complex impedances known to those having skilled in the art. At the base of the sense impedance are the two output nodes of the circuit $V_{DD}$ and Ground. Additionally, adaptive charging circuit 121 and capacitors C1 and C1A may be located between the two output nodes. The power converter will receive the power feed from these two nodes in order to power the network attached device.

Active control circuits 125 and 126 may be employed to ensure that the power signals passed through the transistors are of equal magnitude or balanced based on other criteria. Active control circuits 125 and 126 are operable to provide common mode suppression, insertion loss control, and current balancing by controlling the gate by control signals 105, 106, 111 and 112 which are applied to the gates of differential transistors M1, M2, M3 and M4. Additionally, the active control circuits may provide temperature and load control, or other signal conditioning functions.

The active control circuit may receive inputs 107, 108, 109, and 110 from the sense impedances, inputs from common mode suppression circuits 123 and 124, inputs from L1P, L1N, L2N and L2P. Common mode suppression circuits may be placed between conductors 1, 2, 3 and 6 as shown to sample signals 101, 102, 103 and 104 upstream of RX PHY 128 and TX PHY 127. Additionally this circuitry shows for an Ethernet network connection the connection of conductors 1 and 2 to receive side PHY and conductors 3 and 6 on the transmit side PHY with DC locking capacitors that act to only pass the AC portion of the signal. Power feed portion of the circuit as well as the splitting circuitry as exemplified by the DC blocking capacitors and the diode bridge network may be implemented within an integrated circuit. At a minimum the power feed circuit may be implemented as a discreet integrated circuit. Wherein the discreet or several discreet integrated circuits may be utilized on a printed circuit board in order to realize a network interface as provided by the embodiments of the present invention.

Additional circuits may be used to implement specific functions in accordance with various embodiments of the present invention. These circuits may absorb power sent on differential cable pairs. Specific circuit applications for a portion of the non-magnetic transformer and choke power circuit 46 may utilize source degenerated differential pair of transistors wherein the well is floated relative to the substrate of the silicon devices. This allows the differential high impedance and the common mode short.

In summary, the embodiments of present invention may provide a network powered device operable to receive a network signal that may include both power and data from a coupled network. This network device includes a network connector, a protection circuit, a rectifying circuit, and an integrated circuit. The network connector physically couples the network device to the network. The protection circuit provides surge protection or incoming network signals received by the network device through the network connector. The rectifying circuit sees the output of the protection circuit and is operable to rectify a power signal when contained within the network signal. The integrated circuit further includes a power feed circuit conductively coupled to the protection circuit and the rectifying circuit. This power feed circuit is operable to separate and pass the received data signal to a network physical layer and separate and pass the received power signal to a power management module. The power management module electrically couples to the integrated circuit but is not necessarily part of the integrated circuit. The power management module is operable to at least partially power the network device for specific circuits within the network device from the received power signal.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although embodiments of the present invention are described in detail, it should be understood that various changes, substitutions and alterations can be made hereto without departing from the spirit and scope of the invention.

What is claimed is:

1. An Ethernet network device operable to receive both a power signal and a data signal through a coupled Ethernet network, comprising:
    an Ethernet network connector operable to physically couple the Ethernet network device to the Ethernet network, wherein the Ethernet network connector receives a plurality of twisted pairs;
    an integrated circuit (IC) coupled to the Ethernet network connector comprising a power feed circuit and a surge protection circuit, wherein the power feed circuit is operable to:
        pass the received data signal to an Ethernet physical layer (PHY) module; and
        pass the received power signal to a power management module, wherein the power management module is operable to at least partially power the Ethernet network device from the received power signal; and
    the surge protection circuit interfaces to a diode bridge network and protects against surge voltage across a plurality of twisted pairs within the Ethernet network connector;
    the IC comprising an IC ground that tracks an Ethernet line ground wherein potential at the IC varies up to approximately 1500 volts from chassis ground of the Ethernet network device.

2. The Ethernet network device of claim 1 wherein:
    the power feed circuit in the integrated circuit (IC) comprises a solid-state nonmagnetic transformer that replaces functionality of a magnetic transformer whereby electromagnetic interference is reduced; and
    the IC comprises a high differential impedance and a low common mode impedance wherein the differential impedance is sufficiently high to enable separation of the data signal from the power signal and the common mode impedance is sufficiently low to block alternating current (AC) while passing direct current (DC) without using a choke.

3. The Ethernet network device of claim 1, wherein the IC further comprises at least one circuit selected from the group consisting of:
    a switching/rectifying circuit;
    the power management module;
    the Ethernet physical layer (PHY); and
    an Ethernet media access controller (MAC), wherein the Ethernet PHY module and Ethernet MAC, when coupled, are operable to implement hardware layers of an Ethernet protocol stack.

4. The Ethernet network device of claim 1, wherein the received power signal does not exceed 57 volts.

5. The Ethernet network device of claim 1, wherein the Ethernet PHY module is operable to implement physical layer functions associated with data rates selected from the group of data rates consisting of: 10 Mbps, 100 Mbps, 1 Gbps, and 10 Gbps.

6. The Ethernet network device of claim 1, wherein the Ethernet network device is configured to receive the data signal whether the power signal from the Ethernet network is present or absent.

7. The Ethernet network device of claim 1, wherein the Ethernet network device comprises at least one device selected from the group consisting of:
    a voice over internet protocol (VoIP) telephone;
    an Ethernet router;
    an Ethernet switch;
    a printer;
    a data server;

an Ethernet enabled camera;
a wireless access point;
a base station;
a playback device;
a portable computing device;
a personal data assistant;
a wireless terminal;
a graphics display; and
an audio interface.

8. The Ethernet network device of claim 1, wherein the received power signals are IEEE 802.3af compliant.

9. The Ethernet network device of claim 8 further comprising:
   the Ethernet network connectors comprising an RJ45 connector that physically couples the Ethernet network device to the Ethernet network, and wherein the RJ45 connector couples twisted pairs that further comprise conductors 1 and 2; 3 and 6; 4 and 5; and 7 and 8; and
   a diode bridge network receives the Ethernet power signal utilizing conductors 1, 2, 3, and 6 or conductors 4, 5, 7, and 8.

10. The Ethernet network device of claim 1, wherein the power signal is provided to the Ethernet network from a power sourcing equipment (PSE), and wherein the PSE is operable to determine if the Ethernet network device is IEEE 802.3af power device compliant.

11. The Ethernet network device of claim 1, further comprising:
   direct current (DC) blocking capacitors coupling the Ethernet PHY module to the received signal.

12. The Ethernet network device of claim 1 further comprising:
   a switching/rectifying circuit operable to:
      accept a power signal from the plurality of twisted pairs; and
      route the power signal to an appropriate node of the power feed circuit based on a polarity of the power signal.

13. A method to at least partially power an Ethernet network powered device (PD), from an Ethernet power signal fed through an Ethernet network connection, comprising:
   physically coupling the Ethernet network PD to the network;
   receiving an Ethernet signal from the Ethernet network, wherein the Ethernet signal comprises the plurality of power signals and/or a data signal(s);
   passing the Ethernet signal to an integrated circuit (IC) within the Ethernet network PD, the IC comprising an IC ground that tracks an Ethernet line ground wherein potential at the IC varies up to approximately 1500 volts from chassis ground of the Ethernet network PD;
   separating with the IC, the data signal from the Ethernet signal, wherein the data signal is passed to an Ethernet physical layer (PHY) module;
   separating with the IC, the Ethernet power signal from the Ethernet signal, wherein the power signal is passed to the power management module;
   at least partially powering the Ethernet network PD from the power signal;
   passing the network signal through a protective circuit operable to:
      provide surge protection; and
      rectify the power signal in order to apply the rectified power signal to the IC.

14. The method of claim 13, further comprising interfacing a switching/rectifying circuit with a plurality of twisted pairs, wherein the plurality of twisted pairs pass the Ethernet signal.

15. The method of claim 13, wherein:
   an RJ45 connector physically couples the Ethernet network PD to the Ethernet network, and wherein the RJ45 connector couples twisted pairs that further comprise conductors 1 and 2; 3 and 6; 4 and 5; and 7 and 8; and
   the diode bridge network receives the Ethernet power signal utilizing conductors 1, 2, 3, and 6 or conductors 4, 5, 7, and 8.

16. The method of claim 13, wherein the Ethernet PHY module is operable to implement physical layer functions associated with data rates selected from the group of data rates consisting of: 10 Mbps, 100 Mbps, 1 Gbps, and 10 Gbps.

17. The method of claim 13, wherein the IC further comprises at least one circuit selected from the group consisting of:
   the surge protection circuit;
   the diode bridge network;
   the power management circuit;
   the Ethernet physical layer (PHY); and
   an Ethernet media access controller (MAC), wherein the Ethernet PHY module and Ethernet MAC, when coupled, are operable to implement hardware layers of an Ethernet protocol stack.

18. The method of claim 13, wherein the Ethernet network PD is configured to receive the data signal whether the power signal from the network is present or absent.

19. The method of claim 13, wherein the Ethernet network PD comprises at least one device selected from the group consisting of:
   a voice over internet protocol (VoIP) telephone;
   an Ethernet router;
   an Ethernet switch;
   a printer;
   a data server;
   an Ethernet enabled camera;
   a wireless access point;
   a playback device;
   a portable computing device;
   a personal data assistant;
   a wireless terminal;
   a graphics display; and
   an audio interface.

20. The method of claim 13, wherein the power signal is IEEE 802.3af compliant.

21. The method of claim 13, further comprising:
   supplying the power signal to the Ethernet network from a power sourcing equipment (PSE), and
   operating the PSE to determine whether the Ethernet network device is IEEE 802.3af compliant.

22. The method of claim 13, further comprising:
   using the integrated circuit (IC) to separate the data signal from the network signal using direct current (DC) blocking capacitors that couple the network PHY module to the Ethernet signal; wherein:
   the IC comprises a high differential impedance and a low common mode impedance wherein the differential impedance is sufficiently high to enable separation of the data signal from the power signal and the common mode impedance is sufficiently low to block alternating current (AC) while passing direct current (DC) without using a choke.

23. The method of claim 13, wherein the Ethernet network comprises at least one network selected from the group consisting of:
   a vehicle based network;
   a high speed data network;
   a low speed data network;

a local-interconnect network (LIN);
a controller area network (CAN);
a FlexRay network;
a TTCAN network;
a J1939 compliant network;
a ISO 11898 compliant network; and
an ISO 11519-2 compliant network.

24. An Ethernet network device operable to receive both a power signal and a data signal through a coupled Ethernet network, comprising:
　　an Ethernet network connector operable to physically couple the Ethernet network device to the Ethernet network, wherein the Ethernet network connector receives a plurality of twisted pairs;
　　a circuit coupled to the Ethernet network connector that further comprises a power feed circuit, wherein the power feed circuit is operable to:
　　　　pass the received data signal to an Ethernet PHY module; and
　　　　pass the received power signal to a power management module, wherein the power management module is operable to at least partially power the Ethernet network device from the received power signal,
　　the circuit comprising a circuit ground that tracks an Ethernet line around wherein potential at the circuit varies up to approximately 1500 volts from chassis ground of the Ethernet network device; and
　　a protection circuit coupled to the plurality of twisted pairs that protects against surge across the plurality of twisted pairs.

25. A network device operable to receive both a power signal and a data signal through a coupled network, comprising:
　　a network connector operable to physically couple the network device to the network, wherein the network connector receives a plurality of twisted pairs;
　　a protection circuit, wherein the protection circuit is operable to:
　　　　couple to the plurality of twisted pairs; and
　　　　provide surge protection across the plurality of twisted pairs;
　　a diode bridge, wherein the diode bridge is operable to rectify a power signal received from the plurality of twisted pairs;
　　an integrated circuit (IC) that further comprises a power feed circuit conductively coupled to the surge protection circuit and diode bridge network, and wherein the power feed circuit is operable to:
　　　　pass the received data signal to a network physical layer (PHY) module; and
　　　　pass the received power signal to a power management module, wherein the power management module is operable to at least partially power the network device from the received power signal,
　　the IC comprising an IC ground that tracks an Ethernet line ground wherein potential at the IC varies up to approximately 1500 volts from chassis ground of the network device.

* * * * *

UNITED STATES PATENT AND TRADEMARK OFFICE
CERTIFICATE OF CORRECTION

PATENT NO.       : 7,620,825 B2                                         Page 1 of 1
APPLICATION NO. : 11/207601
DATED            : November 17, 2009
INVENTOR(S)      : Camagna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this

Twenty-sixth Day of October, 2010

David J. Kappos
*Director of the United States Patent and Trademark Office*